United States Patent [19]

Fuke et al.

[11] Patent Number: 4,710,938
[45] Date of Patent: Dec. 1, 1987

[54] METAL ION LASER PROTECTED AGAINST THE DEPOSITION OF METAL VAPOR ON BREWSTER WINDOWS

[75] Inventors: Akira Fuke; Yasuhiro Tokita; Katsuhiko Masuda, all of Shizuoka, Japan

[73] Assignee: Koito Seisakusho Co., Ltd., Tokyo, Japan

[21] Appl. No.: 873,155

[22] Filed: Jun. 6, 1986

[30] Foreign Application Priority Data

Jun. 7, 1985 [JP] Japan .................................. 60-122821
Jun. 7, 1985 [JP] Japan .................................. 60-122822

[51] Int. Cl.$^4$ ............................................. H01S 3/22
[52] U.S. Cl. ........................................ 372/56; 372/61; 372/85; 372/33; 372/88
[58] Field of Search ........................ 372/56, 87, 33, 85, 372/61, 88

[56] References Cited

U.S. PATENT DOCUMENTS

| | | |
|---|---|---|
| 3,868,593 | 2/1975 | Fukuda et al. . |
| 4,021,845 | 5/1977 | Wang . |
| 4,052,680 | 10/1977 | Wang et al. . |
| 4,105,954 | 8/1978 | Wang et al. . |
| 4,193,042 | 3/1980 | Wang . |
| 4,210,876 | 7/1980 | Ogata .................................. 378/61 |
| 4,257,014 | 2/1981 | Hattori et al. . |
| 4,287,484 | 9/1981 | Wang et al. .......................... 372/56 |
| 4,425,651 | 1/1984 | Popp et al. ............................ 372/56 |

FOREIGN PATENT DOCUMENTS

0178810 4/1986 European Pat. Off. .............. 372/56

*Primary Examiner*—Leon Scott, Jr.
*Attorney, Agent, or Firm*—Browdy and Neimark

[57] ABSTRACT

A helium-cadmium ion laser is disclosed which has a tubular housing hermetically closed at both ends by Brewster windows and having a hollow cathode mounted therein. Disposed outside the hollow cathode and open to its interior are a row of primary anodes and a row of metal chambers containing a metal material to be vaporized. A pair of secondary anodes are further disposed adjacent the opposite ends of the hollow cathode for protecting the Brewster windows from contamination by the metal vapor by sending it back into the hollow cathode. In order to prevent the metal vapor from depositing on the ends of the hollow cathode on being thus sent back, a pair of tubular insulators are coaxially mounted next to the opposite ends of the hollow cathode for the passage of the metal vapor therethrough. Each tubular insulator has a bore including a smaller diameter portion away from the hollow cathode, and a larger diameter portion closer to the hollow cathode. Further, for impeding the flow of the metal vapor from the hollow cathode toward the Brewster windows, the laser housing has a pair of constrictions adjacent the Brewster windows.

11 Claims, 11 Drawing Figures

METAL ION LASER PROTECTED AGAINST THE DEPOSITION OF METAL VAPOR ON BREWSTER WINDOWS

BACKGROUND OF THE INVENTION

Our invention relates to lasers in general, and in particular to a metal ion laser utilizing negative glow discharge in an atmosphere of an inert gas such as helium (He) for the vaporization of a metal such as cadmium (Cd). The metal ion laser in accordance with our invention are particularly notable for the facilities for protecting the Brewster windows from contamination by the vaporized metal.

Metal ion lasers are capable of emitting multicolor beams by virtue of the intense excitations offered thereby. He-Cd ion lasers, for example, have so far been observed to emit 12 different color beams including those of the primary colors. The metal ion lasers are definitely suprior in this respect to liquid or solid lasers. There have, however, been some problems left unsolved with metal ion lasers.

The metal ion laser in general has a tubular, elongate housing with its opposite ends closed by Brewster windows. The midportion of this laser housing is equipped with heaters for heating the anodes and the metal chambers containing a source of metal ions. Therefore, during the operation of the laser, its midportion is heated to a significantly higher temperature than are its opposite end portions including the Brewster windows. Such temperature gradients in the longitudinal direction of the laser inevitably invite the flows of the vaporized metal toward its opposite ends and the consequent vapor deposition on the surface bounding the end portions. The metal vapor deposition on the Brewster windows is particularly objectionable because the Brewster windows when so contaminated causes a gradual decrease in the output radiation of the laser.

We are aware of a conventional solution to this problem. It suggests the provision of a pair of secondary anodes adjacent the ends of a hollow cathode nested in the midportion of the laser housing. The secondary anodes are intended to "blow" the metal vapor back into the hollow cathode with a view both to the prevention of Brewster window contamination and to a stronger laser oscillation. This known solution is per se well calculated to accomplish the purposes for which it is intended. We do, however, object to the undue deposition of the metal vapor, when it is blown back by the secondary anodes, on the end portions of the hollow cathode. The accumulation of the deposited metal gradually decreases the inside diameter of the cathode end portions, resulting in a correspond decrease in laser output.

SUMMARY OF THE INVENTION

We have hereby discovered how to effectively prevent, in a metal ion laser of the type defined, the contamination of the Brewster windows by the vaporized metal without the noted difficulties encountered heretofore.

Our invention may be briefly summarized as a metal ion laser comprising a substantially tubular, hermetically sealed housing having its opposite ends closed by Brewster windows. A hollow cathode is mounted within the housing and has its opposite ends disposed at a distance from the Brewster windows. Disposed intermediate the opposite ends of the hollow cathode are primary anode means and metal chamber means which are both open to the interior of the hollow cathode. A pair of secondary anodes are disposed adjacent the opposite ends of the hollow cathode for protecting the Brewster windows from contamination by the metal vapor by sending the metal vapor back into the hollow cathode. In order to prevent the metal vapor, on being thus sent back by the secondary anodes, from depositing on the end portions of the hollow cathode, a pair of tubular insulators are disposed respectively between the opposite ends of the hollow cathode and the secondary anodes and in coaxial relation to the hollow cathode, so that the metal vapor is sent back into the hollow cathode through the tubular insulators. Each tubular insulator has an axial bore including a smaller diameter portion disposed away from the hollow cathode and having a diameter approximately equal to the inside diameter of the hollow cathode, and a larger diameter portion disposed closer to the hollow cathode and having a diameter greater than that of the smaller diameter portion. Further, a pair of constriction means are disposed respectively adjacent the Brewster windows for reducing the inside diameter of the housing and hence for impeding the travel of the metal vapor from the hollow cathode toward the Brewster windows.

Blown back by the secondary anodes, the metal vapor mostly returns to the hollow cathode through the tubular insulators and, in so doing, deposits in the larger diameter portion of the bore of each tubular insulator, rather than in its smaller diameter portion or in the end portion of the hollow cathode. Thus the diameters of the smaller diameter portions of the tubular insulators and the end portions of the hollow cathode do not decrease so rapidly as does the diameter of the larger diameter portions of the tubular insulators. Of course, it takes a much longer time for the diameter of these larger diameter portions of the tubular insulators to become less than the inside diameter of the hollow cathode than if the tubular insulators were of the same inside diameter as the hollow cathode throughout their lengths. It is therefore possible to effectively confine the metal vapor within the hollow cathode for a much longer time than heretofore.

We have further found that the provision of the secondary anodes is not quite sufficient for thoroughly preventing the flows of the metal vapor toward the Brewster windows. Accordingly, in our improved laser construction summarized above, the laser housing is constricted at its points between the tubular insulators and the Brewster windows. These constrictions have proved to be capable of materially reducing the amounts of the metal vapor reaching the Brewster windows.

Thus, all in all, the metal ion laser constructed in accordance with the novel concepts of our invention will maintain its output rating over an extended period of time.

The above and other features and advantages of our invention and the manner of realizing them will become more apparent, and the invention itself will best be understood, from a study of the following description and appended claims, with reference had to the attached drawings showing the preferred embodiments of the invention.

DESCRIPTION OF THE PREFERRED EMBODIMENTS

Figure 1:
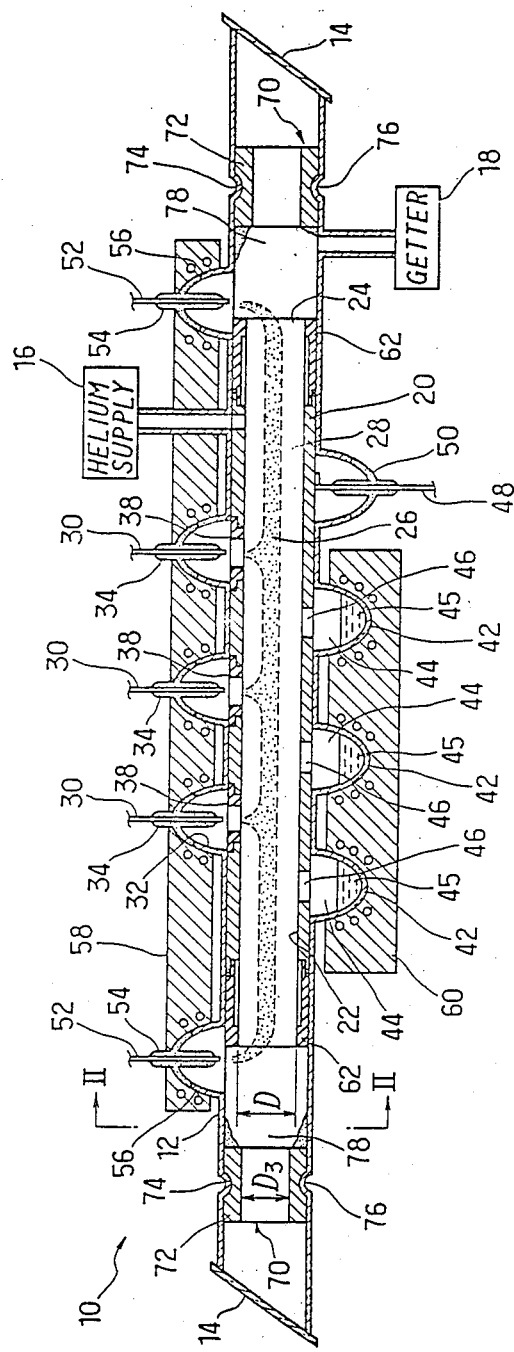
FIG. 1 is an axial section through the metal ion laser embodying the principles of our invention.
Figure 2:
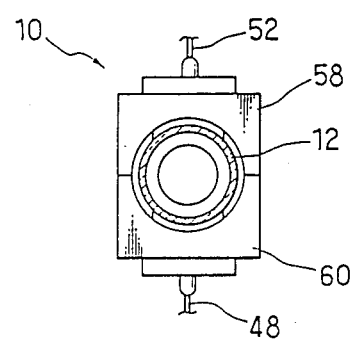
FIG. 2 is a cross section through the laser, taken along the line II—II of FIG. 1.

We will now describe our invention in detail as embodied in the He-Cd ion laser of FIGS. 1 and 2. Generally designated 10, the representative laser of our invention has a substantially tubular, elongate housing 12 having its ends hermetically closed by Brewster windows 14. The sealed interior of the laser housing communicates with a source 16 of He and is filled with this gas. The laser housing 12 also communicates with a getter 18 for the removal of impurities.

Coaxially nested in the midportion of the laser housing 12 is a hollow cathode 20 having its opposite ends spaced a substantial distance from the Brewster windows 14. The hollow cathode 20 takes the form of a relatively thick walled tube of electroconductive material such as stainless steel. The hollow or bore 22 of this cathode provides a positive column discharge path 24, glow region 26 and cathode dark space 28, as is well known to the specialists.

Figure 3:
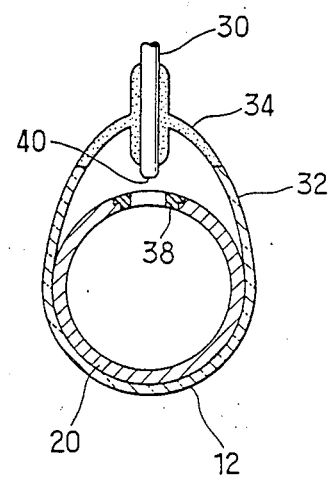
FIG. 3 is an enlarged cross section through the laser, showing in particular the laser housing and one of the primary anodes thereon.
Figure 4:
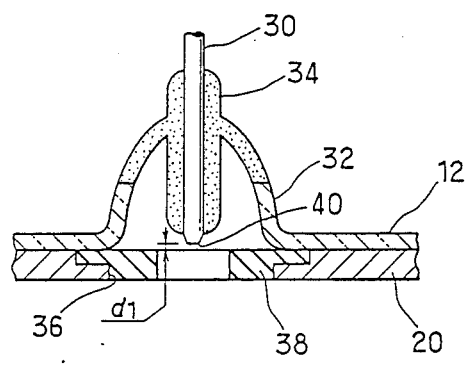
FIG. 4 is is a still more enlarged, fragmentary axial section through the laser, showing in particular one of the primary anodes and associated means.

As shown also in FIGS. 3 and 4, a plurality of, three in the illustrated embodiment, primary anodes 30 are disposed in a row intermediate the opposite ends of the hollow cathode 20 and external thereto. Typically made of tungsten, molybdenum or like metal, each primary anode 30 is rigidly mounted to an anode mount 32 via a glass seal 34. We have shown the anode mount 32 as a protuberant mount of the laser housing 12, protruding radially outwardly therefrom. The laser housing 12, anode mount 32 and glass seal 34 form in combination an oval shape as seen cross sectionally as in FIG. 3. Each primary anode 30 extends radially of the laser housing 12 and is open to the cathode bore 22 via an aperture or stepped hole 36, FIG. 4, in the hollow cathode 20. An annular insulator 38 of a ceramic or like material lines the hole 36 in order to protect the primary anode 30 against the spattering of the hollow cathode 20 and against the consequent shorting of the primary anode and the hollow cathode.

Preferably, and as shown in FIGS. 3 and 4, each primary anode 30 has its extreme tip 40 formed into a conical or frustoconical shape for more effective discharge and by way of protection against thermal impairment from such discharge. This tip 40 of each primary anode 30 is spaced a minimal distance d1 from the circumference of the hollow cathode 20, inclusive of the annular insulator 38, in order that the hollow cathode may not ruin the primary anode during its insertion in the laser housing 12.

The spacings between the three primary anodes 30 can be relatively small. For example, for a laser having an effective length of 300 millimeters (mm) and a cathode bore diameter D of 4 mm, the spacings can each be approximately 20 mm.

The laser housing 12 is formed to include another series of semielliptical protuberances 42, FIG. 1, to provide metal chambers 44 disposed intermediate the opposite ends of the hollow cathode 20. Each metal chamber 44 contains Cd or like metal material 45 to be vaporized. All the metal chambers 44 are open to the cathode bore 22 via a row of slots 46 defined axially in the hollow cathode 20. These metal chambers have the same pitch distances as the primary anodes 30 and are offset therefrom in the longitudinal direction of the laser 10 by half the pitch distance.

Disposed adjacent the metal chambers 44 is a cathode 48 which is mounted to the laser housing 12 via a glass seal 50 in a manner similar to that in which the primary anodes 30 are mounted to the laser housing. The cathode 48 is coupled to the hollow cathode 20 in electrically conducting relation thereto.

A pair of secondary anodes 52 are disposed on both sides of the primary anodes 30, in the longitudinal direction of the laser 10, and adjacent the opposite ends of the hollow cathode 20. As has been known heretofore, the secondary anodes 52 are intended to protect the Brewster windows 14 from contamination by the vaporized metal. Just like the primary anodes 30, these secondary anodes 52 are each mounted via a glass seal 54 to a protuberant anode mount 56 formed in one piece with the laser housing 12.

The primary anodes 30, metal chambers 44 and secondary anodes 52 are conventionally furnished with ceramic heaters 58 and 60. FIG. 2 indicates that the ceramic heaters 58 and 60 can be a unitary body encircling the laser housing 12.

Seen at 62 in FIG. 1 are a pair of tubular insulators of a ceramic or like material constituting a feature of our invention. The tubular insulators 62 are disposed respectively between the opposite ends of the hollow cathode 20 and the secondary anodes 52 and in coaxial relation to the hollow cathode. Thus the metal vapor is sent back by the secondary anodes 52 into the hollow cathode 20 through the tubular insulators 62. Both tubular insulators 62 can be of like configuration, so that we will describe in detail only the left hand one, as seen in FIG. 1, of these insulators, it being understood that the same description applies to the right hand insulator.

Figure 5:
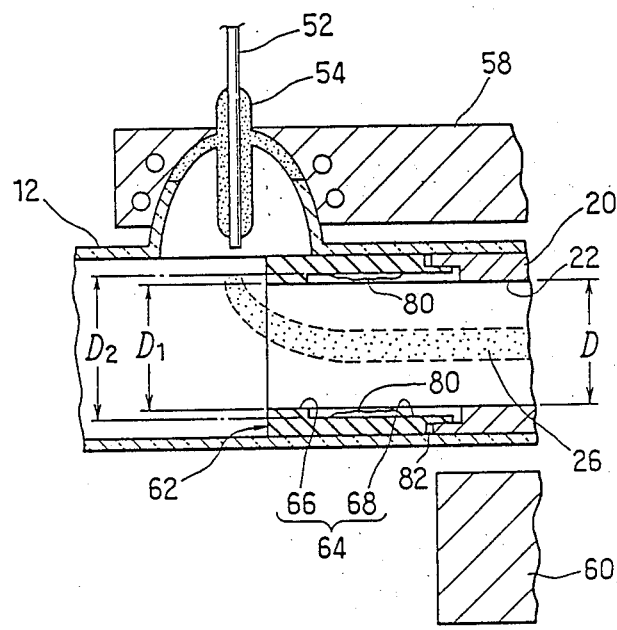
FIG. 5 is also an enlarged, fragmentary axial section through the laser, showing in particular one of the tubular insulators and one associated secondary anode.

As illustrated on an enlarged scale in FIG. 5, the representative tubular insulator 62 has a bore 64 defined axially therethrough. The axial bore 64 has a smaller diameter portion 66 disposed away from the hollow cathode 20, and a larger diameter portion 68 disposed closer to the hollow cathode. The smaller diameter portion 66 has a diameter D1 approximately equal to the diameter D of the cathode bore 22. The larger diameter portion 68 has a diameter D2 greater than the diameter D1 of the smaller diameter portion 66.

Our invention further features a pair of constriction means 70, FIG. 1, disposed between the Brewster windows 14 and the tubular insulators 62 for reducing the diameter of the laser housing 12 at these points and hence for impeding the flows of the metal vapor toward the Brewster windows. Each constriction means 70 of this particular embodiment takes the form of a relatively short tube 72 of such material as a ceramic, a metal having a high heat dissipating capability, etc., which is coaxially mounted within the laser housing 12. The inside diameter D3 of each tube 72 is approximately equal to, or slightly less than, the diameter D of the cathode bore 22. In order to lock each tube 72 against axial displacement relative to the laser housing 12, an annular groove 74 is defined circumferentially in the tube 72, and the laser housing is constricted at 76 into positive engagement in the groove 74 in the tube.

It is to be noted that the tubes 72 of the constriction means 70 are both spaced from the pair of tubular insulators 62 to provide therebetween relatively large diameter vapor chambers 78. These vapor chambers are intended for accelerating the deposition of the metal vapor before it reaches the Brewster windows 14, as will be explained in more detail in the course of the following description of operation.

OPERATION

As is well known, in this type of metal ion laser, a negative glow discharge takes place between primary anodes 30 and hollow cathode 20 upon impression of a required voltage between primary and secondary anodes 30 and 52 and hollow cathode. The negative glow discharge results in the vaporization of the Cd contained in the metal chambers 44. The Cd vapor is excited to higher energy levels by excitation particles such as He ions. Being thick walled as aforesaid, the hollow cathode 20 has sufficient heat conductivity and capacity to afford a uniform temperature distribution of the glow region 26, preventing a transition to arc discharge through abnormal glow discharge.

The pair of secondary anodes 52 function as aforesaid to drive back the Cd vapor into the hollow cathode 20 through the pair of tubular insulators 62. While being thus driven back, the Cd vapor will partly deposit on the inside surfaces of the insulators 62.

We are aware that tubular insulators similar to those of our invention have so far been employed in this type of laser, but for guarding the secondary anodes 52 against the spatter of the hollow cathode 20. Therefore, with this object in view, the conventional insulators have been of the same inside diameter as the hollow cathode throughout their length. The reduction in inside diameter of even the smallest part of each insulator has resulted in a very substantial decrease in the amount of the Cd vapor returned into the hollow cathode 20 and, in consequence, in a corresponding decrease in laser output.

We have therefore created the two different diameter portions 66 and 68, FIG. 5, on the inside of each tubular insulator 62. Flowing back through the smaller diameter portion 66 into the larger diameter portion 68 of each tubular insulator 62, the Cd vapor will expand in volume and so will mostly deposit on the surface bounding this larger diameter portion, as shown with exaggeration at 80 in FIG. 5. Of course, with use of the laser 10 over an extended period of time, the larger diameter portion 68 of the tubular insulator bore 64 will gradually decrease in diameter. But it will take a much longer time for the larger diameter portion 68 becoming smaller in diameter than the cathode bore 22 than if the bore 64 of each tubular insulator 62 were initially of the same diameter as the cathode bore.

Preferably, and as indicated in FIG. 5, a clearance 82 may be provided between each tubular insulator 62 and the hollow cathode 20 in order to allow the thermal expansion of the tubular insulator in its axial direction.

As we have stated in conjunction with the prior art, the provision of the secondary anodes 52 is insufficient to thoroughly confine the Cd vapor, as well as the spatter of the hollow cathode 20, within the hollow cathode itself. Accordingly, we have provided the constriction means 70 between the tubular insulators 62 and the Brewster windows 14. Although fractions of the Cd vapor and cathode spatter will traverse the constriction means 70, most of the particles will stay in the vapor chambers 78 and settle on the surfaces defining these chambers. Further, traveling through the constriction means 70, the noted fractions of the Cd vapor and cathode spatter will partly attach to the inside surfaces of the tubes 72. The remainders of the floating particles that have passed through the constriction means 70 will expand in volume and so will mostly deposit on the inside surfaces of the laser housing 12 rather than on the Brewster windows 14.

We have thus succeeded in drastically reducing the amounts of the Cd vapor and cathode spatter reaching and settling on the Brewster windows 14. The laser 10 will therefore maintain its initial performance characteristics for a remarkably longer period of time than hitherto as the Cd vapor is effectively confined within the hollow cathode 20 and as the Brewster windows 14 are effectively protected against contamination by the Cd vapor and cathode spatter. As an additional advantage of our invention, both tubular insulators 62 and constriction means 70 are so simple and inexpensive in construction that they hardly add to the manufacturing cost of the laser.

MODIFICATIONS

Figure 6:
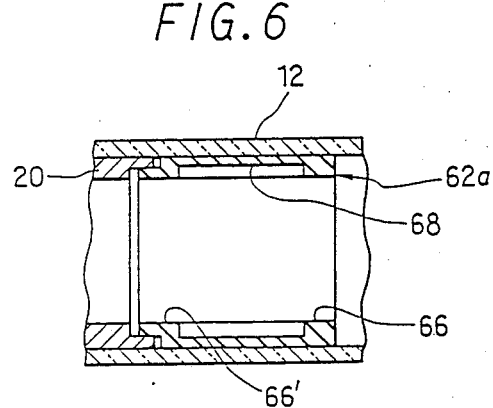
FIG. 6 is an axial section through an alternative form of tubular insulator shown mounted in position in the laser of FIG. 1.

We have shown in FIG. 6 a modified tubular insulator 62a mounted in place within the housing 12 of the metal ion laser 10 of FIG. 1 in substitution for each tubular insulator 62. The modified tubular insulator 62a has a second smaller diameter portion 66' disposed immediately next to the hollow cathode 20 and having approximately the same diameter as that of the first smaller diameter portion 66 and as the inside diameter of the hollow cathode. The larger diameter portion 68 exists between the two smaller diameter portions 66 and 66'. The modified tubular insulators 62a offers the same advantages as the insulators 62.

FIGS. 7 through 11 are illustrations of various possible modifications of the constriction means 70.

Figure 7:
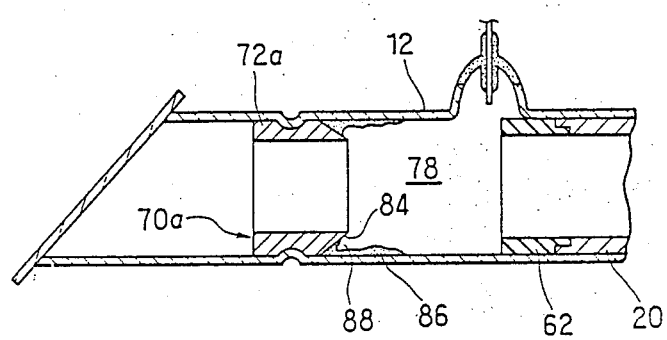
FIG. 7 is an axial section through an alternative form of constriction means shown mounted in position in the laser.

Each constriction means 70a of FIG. 7 has a short tube 72a mounted in place within the laser housing 12 in a manner similar to each tube 72 of the constriction means 70. However, the tube 72a has a tapered end portion 84 directed toward the hollow cathode 20, or toward one of the tubular insulators 62. The tapered end portion 84 serves to increase the capacity of the vapor chamber 78 and, as indicated at 86, to cause the Cd vapor and cathode spatter to collect in the space 88 between the tapered end portion and the laser housing 10.

Figure 8:
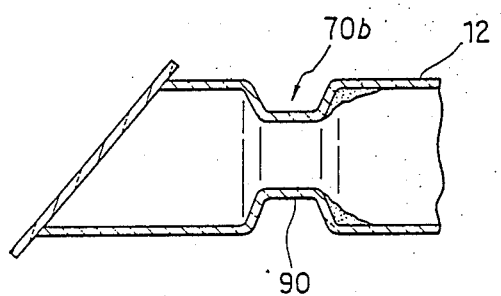
FIG. 8 is a view similar to FIG. 7 but showing another different form of constriction means.

Each constriction means 70b of FIG. 8 is formed by a constriction 90 in the laser housing 12 itself.

Figure 9:
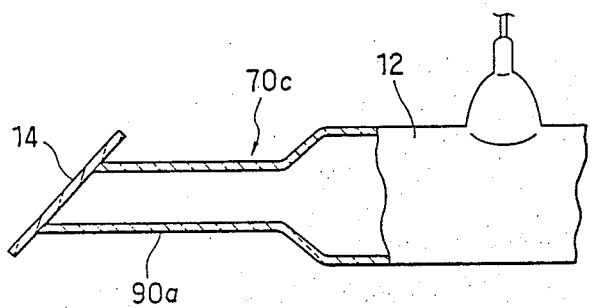
FIG. 9 is also a view similar to FIG. 7 but showing still another different form of constriction means.

FIG. 9 shows a slight modification 70c of the FIG. 8 constriction means 70b. In this modification each constriction 90a in the laser housing 12 extends to one of the Brewster windows 14.

Figure 10:
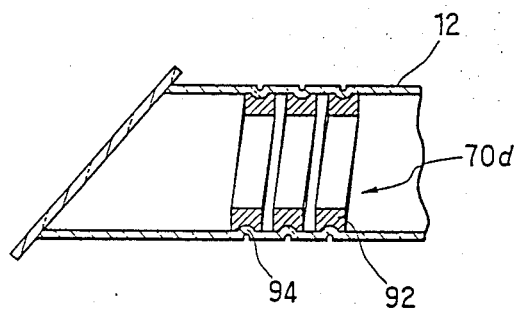
FIG. 10 is also a view similar to FIG. 7 but showing a further different form of constriction means.

In FIG. 10 each constriction means 70d comprises a helical member 92 mounted within the laser housing 12 and engaged with constrictions 94 of the laser housing thereby to be locked against axial displacement. The constrictions 94 will be unnecessary if a helical spring is employed as the helical member and is self biased into a press fit with the laser housing 12.

Figure 11:
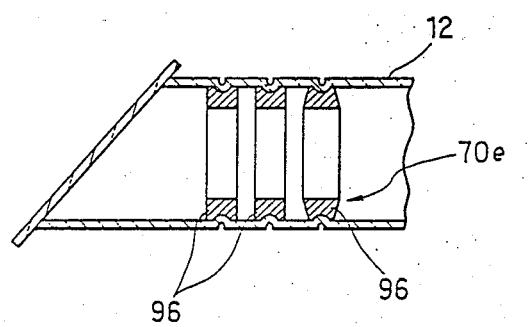
FIG. 11 is also a view similar to FIG. 7 but showing a still further different form of constriction means.

Each constriction means 70e of FIG. 11 comprises a coaxial row of rings 96 mounted within the laser housing 12 with spacings from each other.

It is to be understood that we have shown and described the foregoing preferable embodiments merely to illustrate or explain and not to impose limitations upon our invention. Various modifications or changes of the illustrated embodiments will occur to the specialists without departing from the scope of our invention.

We claim:

1. A metal ion laser for generating a laser beam by utilizing negative glow discharge, comprising:
   (a) a substantially tubular, hermetically sealed housing of an electrically nonconducting material having a pair of Brewster windows at its opposite ends;
   (b) a hollow cathode mounted within the housing and having opposite ends disposed at a distance from the Brewster windows;
   (c) primary anode means disposed intermediate the opposite ends of the hollow cathode and open to the interior thereof;
   (d) metal chamber means for containing a metal material to be vaporized, the metal chamber means being disposed intermediate the opposite ends of the hollow cathode and open to the interior thereof;
   (e) a pair of secondary anodes disposed adjacent the opposite ends of the hollow cathode for protecting the Brewster windows from contamination by the metal vapor by sending the metal vapor back into the hollow cathode;
   (f) a pair of tubular insulators disposed respectively between the opposite ends of the hollow cathode and the secondary anodes and in coaxial relation to the hollow cathode, so that the metal vapor is sent back by the secondary anodes into the hollow cathode through the tubular insulators;
   (g) each tubular insulator having an axial bore including a smaller diameter portion and a larger diameter portion, the smaller diameter portion of the bore being disposed away from the hollow cathode and having a diameter approximately equal to the inside diameter of the hollow cathode, the larger diameter portion of the bore being disposed closer to the hollow cathode and having a diameter greater than that of the smaller diameter portion; and
   (h) a pair of constriction means disposed respectively adjacent the Brewster windows for reducing the inside diameter of the housing and hence for impeding the travel of the metal vapor from the hollow cathode toward the Brewster windows.

2. The metal ion laser of claim 1 wherein a clearance is provided between each tubular insulator and the hollow cathode in order to allow the thermal expansion of the tubular insulator in its axial direction.

3. The metal ion laser of claim 1 wherein the axial bore of each tubular insulator has another smaller diameter portion disposed immediately next to the hollow cathode and having approximately the same diameter as the inside diameter of the hollow cathode.

4. The metal ion laser of claim 1 wherein the pair of constriction means are spaced respectively from the pair of tubular insulators to provide relatively large diameter spaces for accelerating the deposition of the metal vapor.

5. The metal ion laser of claim 1 wherein each constriction means comprises a tube of relatively short axial dimension mounted within the housing.

6. The metal ion laser of claim 5 wherein the tube of each constriction means has an annular groove formed circumferentially therein, and wherein the tube is retained in position by engaging part of the housing in the annular groove.

7. The metal ion laser of claim 5 wherein the tube of each constriction means has a tapered end portion directed toward the hollow cathode.

8. The metal ion laser of claim 1 wherein each constriction means comprises a constriction formed in the housing.

9. The metal ion laser of claim 8 wherein the constriction of each constriction means extends to one of the Brewster windows.

10. The metal ion laser of claim 1 wherein each constriction means comprises a helical member mounted within the housing.

11. The metal ion laser of claim 1 wherein each constriction means comprises a coaxial row of rings mounted within the housing.

* * * * *